(12) United States Patent
Wong et al.

(10) Patent No.: US 11,752,773 B2
(45) Date of Patent: Sep. 12, 2023

(54) PRINTING AGENT TRANSFER FOR 2D AND 3D PRINTERS

(71) Applicant: Hewlett-Packard Development Company, L.P., Spring, TX (US)

(72) Inventors: Howard G Wong, Vancouver, WA (US); Wesley Schalk, Vancouver, WA (US); Kris Randall Livingston, Boise, ID (US); Kenneth Russell Williams, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 123 days.

(21) Appl. No.: 17/298,554

(22) PCT Filed: Jul. 8, 2019

(86) PCT No.: PCT/US2019/040812
§ 371 (c)(1),
(2) Date: May 29, 2021

(87) PCT Pub. No.: WO2021/006864
PCT Pub. Date: Jan. 14, 2021

(65) Prior Publication Data
US 2022/0118767 A1  Apr. 21, 2022

(51) Int. Cl.
*B41J 2/175* (2006.01)
*B29C 64/259* (2017.01)
*B33Y 30/00* (2015.01)

(52) U.S. Cl.
CPC ......... *B41J 2/17546* (2013.01); *B29C 64/259* (2017.08); *B41J 2/17566* (2013.01);
(Continued)

(58) Field of Classification Search
CPC .... B41J 2/175; B41J 2/17503; B41J 2/17506; B41J 2/17509; B41J 2/17546;
(Continued)

(56) References Cited

U.S. PATENT DOCUMENTS 6,039,430 A * 3/2000 Helterline ............ B41J 2/17546
400/208
6,113,208 A * 9/2000 Benjamin ............ B41J 2/17546
347/7

(Continued)

FOREIGN PATENT DOCUMENTS

EP 1164025 A1 12/2001
EP 2436522 A2 4/2012
(Continued)

*Primary Examiner* — Anh T Vo
(74) *Attorney, Agent, or Firm* — Brooks, Cameron & Huebsch, PLLC (57) ABSTRACT

In one example, a system to fill or drain a reservoir in a printer includes a controller to set a unit to a total capacity of a container divided by an integer greater than 1, a container sensor to sense the container connected to the printer, and a pump to pump, in set unit increments, at least one unit of a printing agent from the container to the reservoir or from the reservoir to the container. In one example, a memory having processor executable instructions to generate a graphical user interface displaying, during the transfer of a printing agent from a container to a reservoir in a printer or from the reservoir to the container, an animation showing a changing volume of the printing agent in the reservoir and a corresponding changing volume of the printing agent in the container.

23 Claims, 11 Drawing Sheets

(52) U.S. Cl.
CPC ........... *B41J 2/17596* (2013.01); *B33Y 30/00* (2014.12); *B41J 2002/17573* (2013.01)

(58) Field of Classification Search
CPC .............. B41J 2/17566; B41J 2/175496; B41J 2002/17573; B29C 64/259; B33Y 30/00
See application file for complete search history.

(56) References Cited

U.S. PATENT DOCUMENTS

| | | |
|---|---|---|
| 6,155,664 A | 12/2000 | Cook |
| 6,648,434 B2 | 11/2003 | Walker et al. |
| 6,685,296 B2 | 2/2004 | Mochizuki et al. |
| 6,938,976 B2 | 9/2005 | Siwinski et al. |
| 7,901,063 B2 | 3/2011 | Wouters et al. |
| 8,104,855 B2 | 1/2012 | Tamaki et al. |
| 8,668,319 B2 | 3/2014 | Gonzales et al. |
| 10,317,815 B2 | 6/2019 | Saiki |
| 11,090,942 B2 * | 8/2021 | Gardner ............... B41J 2/16517 |
| 2004/0091275 A1 | 5/2004 | Matsuda et al. |
| 2007/0097189 A1 | 5/2007 | Umeda et al. |
| 2008/0018717 A1 | 1/2008 | Cocklin et al. |
| 2008/0273047 A1 | 11/2008 | Kawarazuka et al. |
| 2012/0134686 A1 | 5/2012 | Jones et al. |
| 2013/0106968 A1 | 5/2013 | Matsumoto et al. |
| 2013/0127936 A1 | 5/2013 | Duffield et al. |
| 2016/0001566 A1 | 1/2016 | Shibata |
| 2018/0099458 A1 | 4/2018 | Crear et al. |
| 2018/0154649 A1 | 6/2018 | Ueda et al. |
| 2018/0281284 A1 | 10/2018 | Elgar et al. |
| 2019/0092037 A1 | 3/2019 | Murata |
| 2019/0111694 A1 | 4/2019 | Cumbie et al. |

FOREIGN PATENT DOCUMENTS

| | | |
|---|---|---|
| GB | 2350220 A | 11/2000 |
| WO | 2004/044816 A1 | 5/2004 |
| WO | 2006/075314 A2 | 7/2006 |
| WO | 2011/002767 A2 | 1/2011 |
| WO | WO 2011/011824 A1 | 2/2011 |

* cited by examiner

PRINTING AGENT TRANSFER FOR 2D AND 3D PRINTERS

BACKGROUND

Inkjet printers dispense liquid onto a substrate in the form of drops or streams. For example, 2D inkjet printers dispense ink onto paper and other print substrates with an inkjet type dispenser. For another example, 3D inkjet printers dispense liquid fusing agents onto build materials with an inkjet type dispenser.

DRAWINGS

The same part numbers designate the same or similar parts throughout the figures.

DESCRIPTION

In some 2D and 3D inkjet printers, the printheads are assembled in a printbar that spans a full width of the print substrate. Ink or another liquid is pumped to the printbar from a reservoir separate from the printbar to continuously supply the printheads with ink. A separate reservoir, pump, and flow path are used for each of the different color inks. This type of ink delivery system is sometimes called a continuous ink delivery system.

Currently, processes used to fill the reservoirs in a continuous ink delivery system may not accurately determine the volume of ink transferred from the supply containers to the printer reservoirs. The lack of accurate ink transfer data makes it difficult to reliably track and control ink supplies, particularly for print service providers managing fleets of printers. This difficulty increases when supply containers are partially emptied during fill. In addition, current fill techniques do not provide real time feedback during fill operations to monitor the transfer process.

A new transfer process has been developed to help accurately determine and control the volume of ink or other printing agents transferred from the supply containers to the internal reservoirs in a 2D or 3D printer. In one example, a process to fill a reservoir in the printer includes setting a unit to a total capacity of a container divided by an integer greater than 1, sensing when a supply container is connected to the printer, and then transferring the printing agent from the container to the reservoir in set unit increments. For example, the unit may be set to ½, ¼, or ⅛ the total capacity of the container. The process may also include setting a number of the units to transfer and transferring the set number of units from the container to the reservoir. The settings may be made by a user entering selections through a user interface or by default.

For example, a 1 liter (1000 ml) ink supply container may be divided logically into 8 discrete units by setting each unit at 125 ml. To fill a 1 liter ink reservoir that still contains 250 ml, the number of units to transfer may be set at 6, and 6 units of ink totaling 750 ml pumped from the supply container into the reservoir to completely fill the reservoir. Before disconnecting the supply container from the printer, the memory chip on the container is updated to show that 2 units of ink remain in the container, allowing a print service provider or other user to accurately inventory, track and re-use the partially depleted container.

A new process has also been developed to monitor the transfer in real time. In one example, a monitoring process includes, during the transfer, determining the changing volume of the printing agent in the reservoir and the corresponding changing volume of the printing agent in the container, and displaying an animation showing the changing volumes. The animation may include, for example: a printer symbol; a first container symbol connected to the printer symbol to show that the container is connected to the printer; a reservoir symbol associated with the printer symbol to show the changing volume in the reservoir; a second container symbol near the reservoir symbol to show a changing volume in the container; and a flow symbol between the reservoir symbol and the container symbol to show that printing agent is being transferred from the container to the reservoir.

Examples of the transfer process may also be used to drain agent from the printer reservoir into a container to reclaim unused agent.

While some examples are described with reference to liquid printing agents and inkjet printers, examples may also be implemented in other types of printers for other printing agents, including dry toner. The examples described herein illustrate but do not limit the scope of the patent, which is defined in the Claims following this Description.

As used in this document, "and/or" means one or more of the connected things; a "memory" means any non-transitory tangible medium that can embody, contain, store, and/or maintain instructions for execution by a processor, including circuits, integrated circuits, ASICs (application specific integrated circuits), hard drives, random access memory (RAM), and/or read-only memory (ROM); a "printer" means a device that dispenses a printing agent, including 2D printers and 3D printers; and a "printing agent" means any printable substance including, for example, ink and toner for 2D printers and fusing agents for 3D printers.

Figure 1:
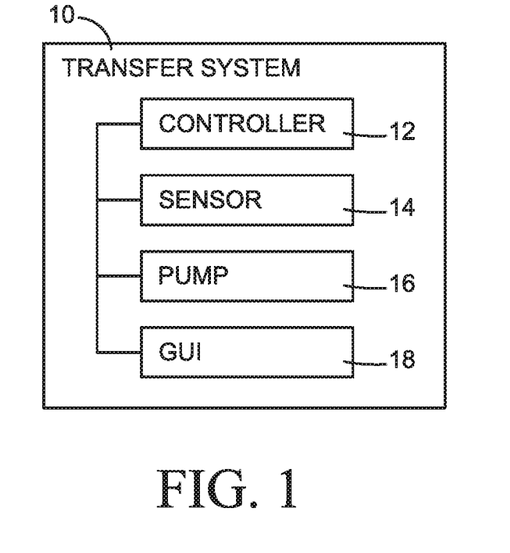
FIG. 1 illustrates one example of a transfer system to fill an ink or other printing agent reservoir in a printer from a container or to drain the reservoir to the container.

FIG. 1 illustrates one example of a transfer system 10 to fill an ink or other printing agent reservoir in a printer from a container or to drain the reservoir to the container. Referring to FIG. 1, system 10 includes a controller 12 and a sensor 14, pump 16, and graphical user interface 18 operatively connected to controller 12. Controller 12 is programmed to set a transfer unit to the total capacity of a fill/drain container divided by an integer greater than 1. For example, the transfer unit may be set to ½, ⅓, or ¼ the total capacity of the container. Sensor 14 senses when the container is connected to the printer. Pump 16 pumps printing agent from the container to the reservoir or from the reservoir to the container in set unit increments, at the direction of controller 12. For example, if the transfer unit is set to ¼ the total capacity of the container, then controller 12 may direct pump 16 to pump 1, 2, 3, or 4 units to the reservoir from the container or from the reservoir to the container.

Controller 12 includes the programming, processing and associated memory resources, and the other electronic circuitry and components to control the other operative elements of system 10. In the example shown in FIG. 2, controller 12 includes a processor 20 and a memory 22 in communication with processor 20. Memory 22 includes transfer instructions 24 which represent programming to set a transfer unit to the total capacity of the fill/drain container divided by an integer greater than 1, receive signals from sensor 14 sensing when a container is connected to the printer, and to direct pump 16 to pump printing agent from the container to the reservoir or from the reservoir to the container in set unit increments. Controller 12 may reside on a printer or controller 12 may be remote from the printer. Graphical user interface 18 may reside on a printer or graphical user interface 18 may be remote from the printer.

Figure 2:
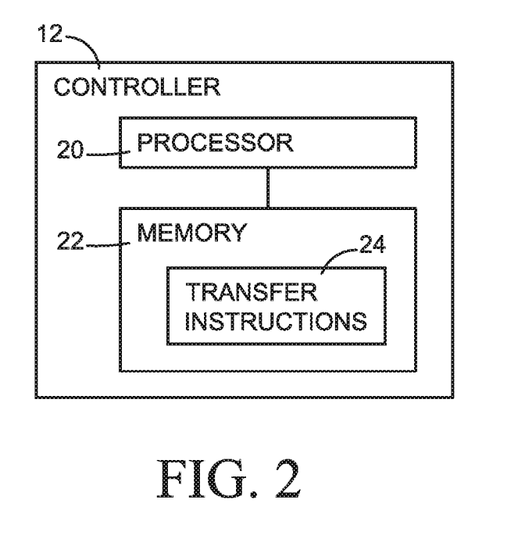
FIG. 2 illustrates one example of a controller in the system of FIG. 1.

Instructions 24 may include programming for controller 12 to set the transfer unit to a default or to a user selection received through graphical user interface 18. Instructions 24 may also include programming for controller 12 to display an animation on graphical user interface 18 showing the changing volume of printing agent in the reservoir and the corresponding changing volume of printing agent in the container as printing agent is pumped to or from the reservoir.

Figure 3:
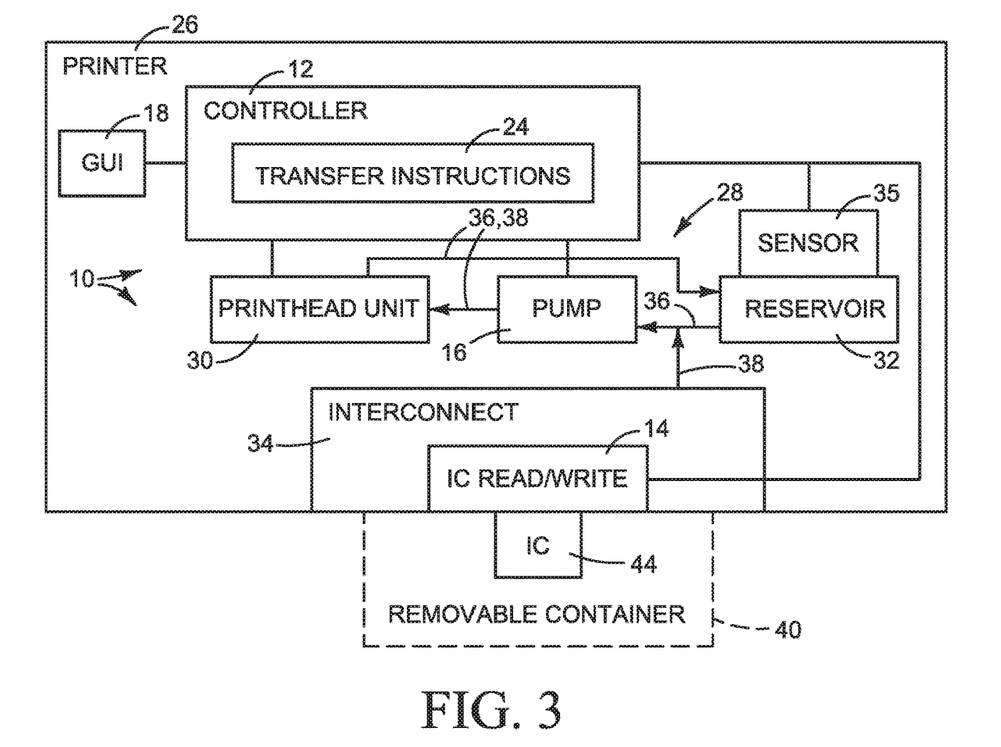
FIG. 3 illustrates one example of a printer implementing a transfer system such as that shown in FIG. 1.

FIG. 3 illustrates one example of an inkjet printer 26 implementing a transfer system 10 such as that shown in FIG. 1. Referring to FIG. 3, printer 26 includes a controller 12 with transfer instructions 24, a graphical user interface 18 operatively connected to controller 12, and a continuous liquid delivery system 28. Liquid delivery system 28 includes a printhead unit 30, a reservoir 32 separate from printhead unit 30, an interconnect 34, a reversible pump 16, a supply flow path 36 from reservoir 32 through printhead unit 30 and back to reservoir 32, and a fill/drain flow path 38 from interconnect 34 to reservoir 32. A sensor 35 senses the volume of ink or other liquid in reservoir 32, for example by signaling controller 12 the level of liquid in the reservoir. Delivery system 28 also includes a removable container 40 during fill and drain operations. Removable container 40 is depicted with dashed lines to indicate a removable component that is not a fixed part of liquid delivery system 28.

Printhead unit 30 includes one or multiple printheads and flow structures to carry ink or other liquid to the printhead (s). A printhead unit 30 usually will also include a pressure regulator or other flow control device to help control the flow of liquid to each printhead. Although a single printhead unit 30 is shown, delivery system 28 may include multiple printhead units 30. Printhead unit 30 may be implemented, for example, as a substrate wide printbar in a 2D inkjet printer to dispense ink, or as an agent dispenser in a 3D inkjet printer to dispense fusing, detailing, coloring, and/or other liquid manufacturing agents. Each of multiple liquid delivery systems 28 may be used to deliver each of multiple corresponding liquids. During a dispensing operation, when a container 40 is not connected to printer interconnect 34, pump 16 pumps liquid from reservoir 32 along supply flow path 36 through printhead unit 30 and back to reservoir 32, for example at the direction of controller 12. A controller 12 in printer 26 represents the processing and memory resources, programming, and the electronic circuitry and components needed to control the operative components of delivery system 28 and transfer system 10, and may include distinct control elements for individual system components.

When controller 12 is instructed to conduct a fill operation, for example through a user input to graphical user interface 18, and a removable container 40 is connected to interconnect 34, sensor 14 at interconnect 34 senses the presence of container 40 and signals controller 12 that container 40 is connected to the printer. Controller 12 then directs pump 16 to pump liquid 42 from container 40 along flow path 38 to reservoir 32, for example in set unit increments as described above with reference to FIG. 1. When container 40 is disconnected from interconnect 34, sensor 14 signals controller 12 that container 40 is disconnected from the printer.

In the example shown in FIG. 3, sensor 14 is implemented as an integrated circuit device reader that senses the presence of container 40 and reads information from an integrated circuit device 44 on container 40. An integrated circuit device 44 on container 40 usually includes a memory storing information about container 40 including, for example, a container identification, the total capacity of the container, the type of liquid in the container, and the volume of liquid in the container (if less than the total capacity). Sensor 14 may also include an integrated circuit device writer to write information to container integrated circuit 44, for example to update the memory on integrated circuit 44 with the volume of liquid in container 40 upon completion of the fill operation.

In this example, fill/drain flow path 38 is coextensive with supply flow path 36 through pump 16 and printhead unit 30 such that liquid may continue to circulate through printhead unit 30, if desired, during a fill operation. Interconnect 34 allows liquid to flow out of container 40 into flow path 38 and to seal against the pump pressure when a container 40 is not connected to interconnect 34. Interconnect 34 may be implemented, for example, as a needle/septum seal, a humidor or other suitable passive flow device, or as an active valve operated automatically at the direction of controller 12, to allow the flow of liquid from container 40 into flow path 38 when a container 40 is connected to interconnect 34.

When controller 12 is instructed to conduct a drain operation, for example through a user input to graphical user interface 18, and a removable container 40 is connected to interconnect 34, sensor 14 at interconnect 34 senses the presence of container 40 and signals controller 12 that container 40 is connected to the printer. Controller 12 then directs pump 16 to pump liquid 42 from reservoir 32 along flow path 38 to container 40, for example in set unit increments as described above with reference to FIG. 1. When container 40 is disconnected from interconnect 34, sensor 14 signals controller 12 that container 40 is disconnected from the printer.

Figure 4:
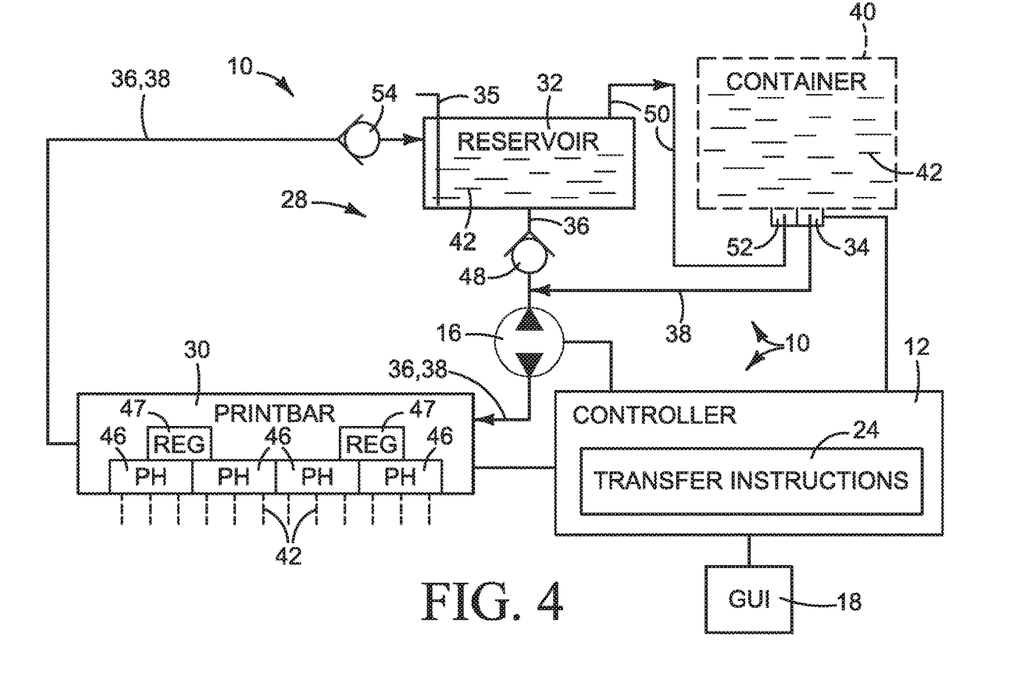
FIG. 4 illustrates one example implementation for the printer shown in FIG. 3.

FIG. 4 illustrates one example implementation for transfer and delivery systems 10, 28 shown in FIG. 3. In the example shown in FIG. 4, printhead unit 30 is implemented as a printbar with multiple printheads 46 and flow regulators 47 each to regulate the flow of liquid to the corresponding printheads 46. A check valve or other suitable pressure control device 48 is positioned in supply flow path 36 between reservoir 32 and pump 16, upstream from fill/drain flow path 38, to enable the preferential flow of liquid from a removable container 40. In a drain operation, liquid can flow directly from reservoir 32 through pressure control device 48 and interconnect 34 to container 40.

In this example, delivery system 28 also includes a third flow path 50 from reservoir to a second interconnect 52 for removable container 40. Air is pushed out of reservoir 32 into container 40 through interconnect 52 as the reservoir fills with liquid 42. Flow path 50 also allows liquid 42 to flow from reservoir 32 into container 40 so that liquid will circulate through system 10 when reservoir 32 is full, enabling a self-limiting fill process. Where the pumps 16 in multiple transfer and delivery systems 10, 28 are driven by a single motor, the example shown in FIG. 4 allows the motor to continue to run even after one reservoir 32 is full to continue to fill the other reservoir(s) 32.

When a container 40 is not connected to interconnect 34, air is vented to the atmosphere from reservoir 32 through flow path 50 and second interconnect 52. Interconnect 52 may be implemented as a needle/septum interface, for example, to vent reservoir 32 and seal a container 40 when a container 40 is not connected. Interconnects 34 and 52 may be incorporated into a single interconnect assembly. Also, in this example, a check valve or other suitable pressure control device 54 is positioned in flow path 36/38 between printbar 30 and reservoir 32 to allow pump 16 to maintain positive gauge pressure at regulators 47 when not filling reservoir 32 from a container 40.

The flow arrows along paths 36 and 38 in FIGS. 3 and 4 indicate a fill operation. The flow arrows along fill/drain path 38 are reversed between reservoir 32 and interconnect 34 during a drain operation.

FIGS. 3 and 4 show example configurations for transfer and delivery systems 10, 28. Other suitable configurations are possible. For example, a transfer system 10 may utilize gravity (instead of pump pressure) to fill the reservoir. In a gravity feed transfer system, the transfer of liquid to the reservoir may be controlled by regulating the flow of liquid and/or air between the container and the reservoir. While a single pump system is shown, a multiple pump system could be used, for example with one pump for pumping liquid from the reservoir to the printhead unit and other pumps for pumping liquid to and from a fill/drain container.

Figure 5:
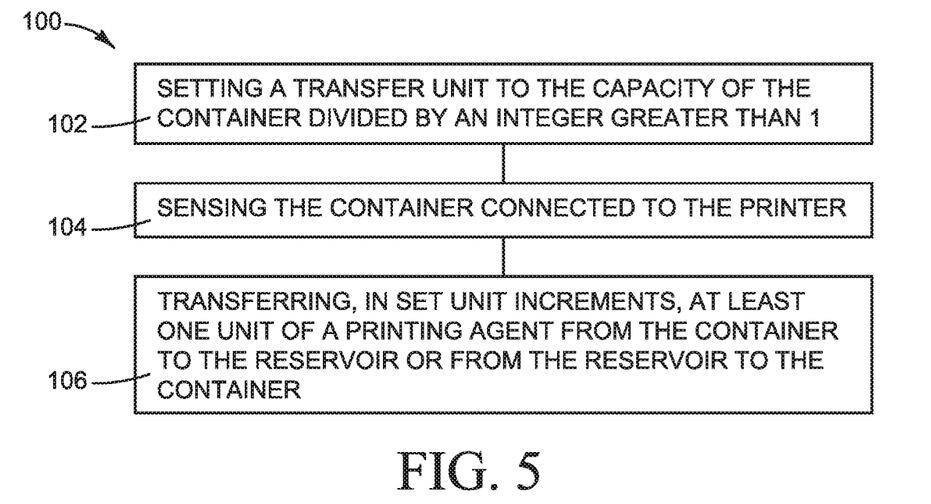
FIGS. 5-7 illustrate examples of a transfer process such as might be implemented in a transfer system shown in FIGS. 1-4.

FIG. 5 is a flow diagram illustrating one example transfer process such as might be implemented by a processor 20 executing instructions 24 on controller 12 in a transfer system 10 shown in FIGS. 1-4. Referring to FIG. 5, a process 100 includes setting a transfer unit to a total capacity of a container divided by an integer greater than 1 (block 102), sensing the container connected to the printer (block 104), and transferring, in set unit increments, at least one unit of a printing agent from the container to the reservoir or from the reservoir to the container (block 106). The transfer unit may be set to a default or to a user selection received through a graphical user interface.

Figure 6:
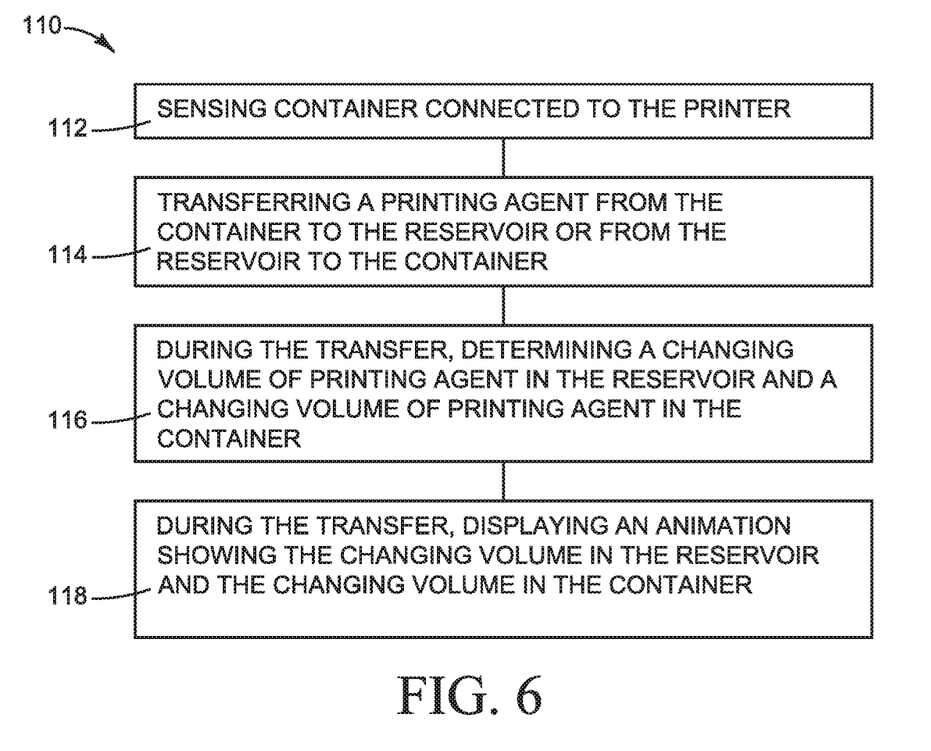

FIG. 6 is a flow diagram illustrating another example transfer process such as might be implemented by a processor 20 executing instructions 24 on controller 12 in a transfer system 10 shown in FIGS. 1-4. Referring to FIG. 6, a process 110 includes sensing the container connected to the printer (block 112), transferring a printing agent from the container to a reservoir in the printer or from the reservoir to the container (block 114), and, during the transfer, determining a changing volume of printing agent in the reservoir and a changing volume of printing agent in the container (block 116) and displaying an animation showing the changing volume in the reservoir and the changing volume in the container (block 118).

The animation may be generated by the controller monitoring the reservoir level sensor to repeatedly determine the volume of printing agent in the reservoir during the transfer and repeatedly compute the corresponding volume of printing agent in the container. Where a controller monitors the reservoir level sensor continuously, then the volume determination and computation cycles may be repeatedly rapidly so that the animation simulates continuously changing volumes in the reservoir and the container during the transfer. Upon completing the transfer, the animation is stopped and the completion displayed by, for example, displaying the volume of printing agent in the reservoir, the volume of printing agent in the container when the transfer is complete, and the total volume of printing agent transferred.

In one example, the number of units to transfer is set by the controller receiving a selection through the user interface. In another example, the number of units to transfer is set by the controller determining a volume of printing agent in the reservoir based on readings from a reservoir level sensor and computing the number of units to transfer based on the volume of printing agent in the reservoir. For example, if the transfer unit is set to 125 ml and there is 125 ml of printing agent in a 500 ml reservoir, then the controller may set the number of units to transfer to 3 to completely fill the reservoir. For another example, if the transfer unit is set to 125 ml and there is 150 ml of printing agent in a 500 ml reservoir, then the controller may set the number of units to transfer to 2 to fill the reservoir as full as possible while transferring unit increments.

Figure 7:
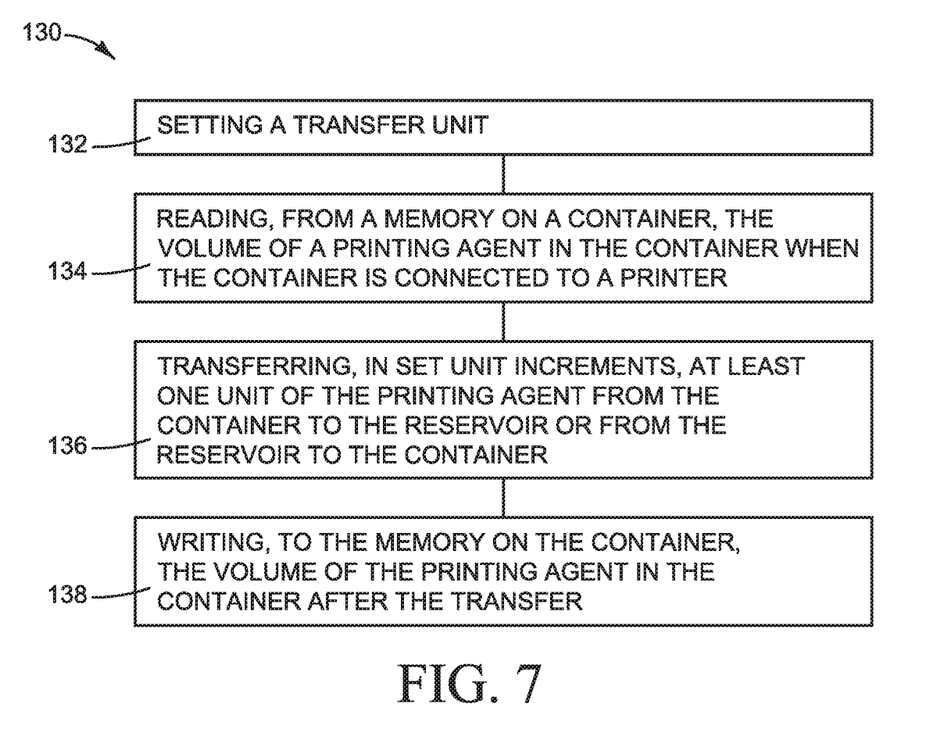

FIG. 7 is a flow diagram illustrating another example transfer process such as might be implemented by a processor 20 executing instructions 24 on controller 12 in a transfer system 10 shown in FIGS. 1-4. Referring to FIG. 7, a process 130 includes setting a transfer unit (block 132), reading, from a memory on a container, the volume of a printing agent in the container when the container is connected to a printer (block 134), transferring, in set unit increments, at least one unit of the printing agent from the container to a reservoir in the printer or from the reservoir to the container (block 136), and writing, to the memory on the container, the volume of printing agent in the container after the transfer (block 138). In one example, the transfer unit is set at block 132 to a total capacity of a container divided by an integer greater than 1.

Figure 18:
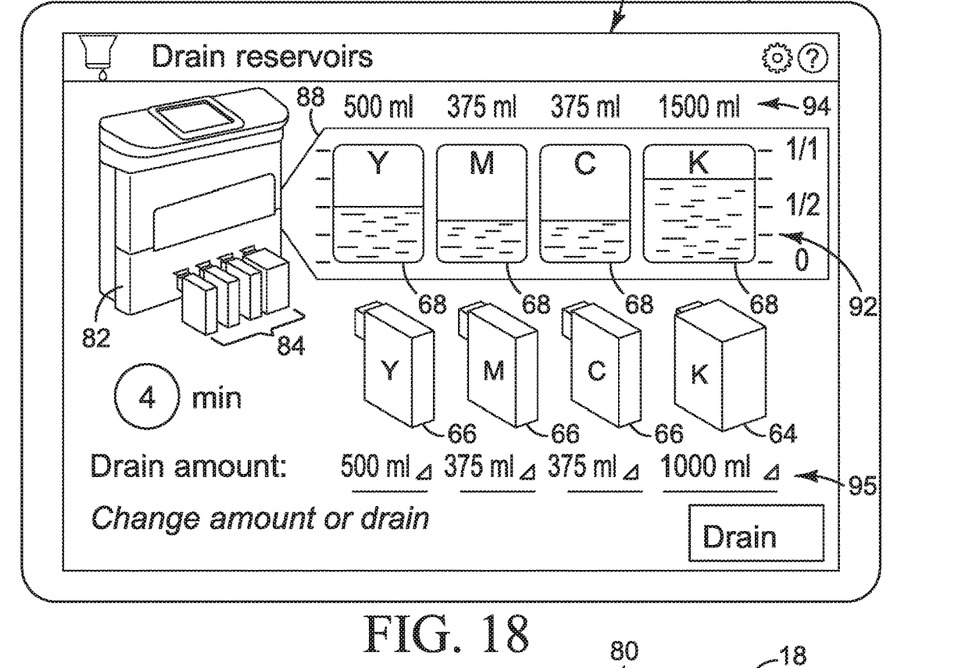
Figure 19:
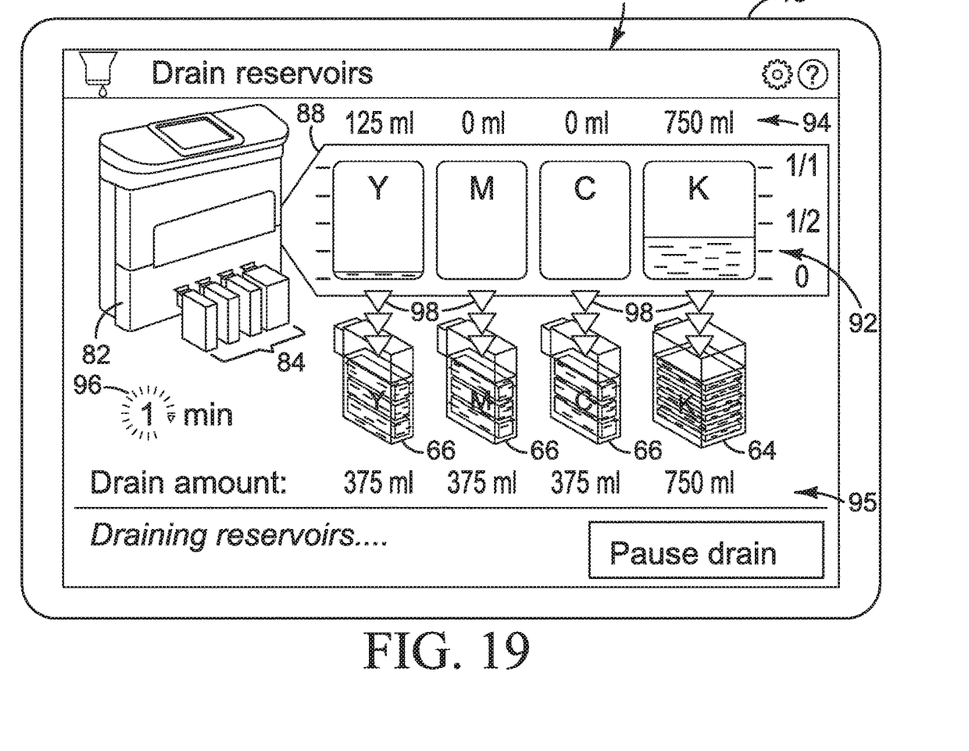
Figure 20:
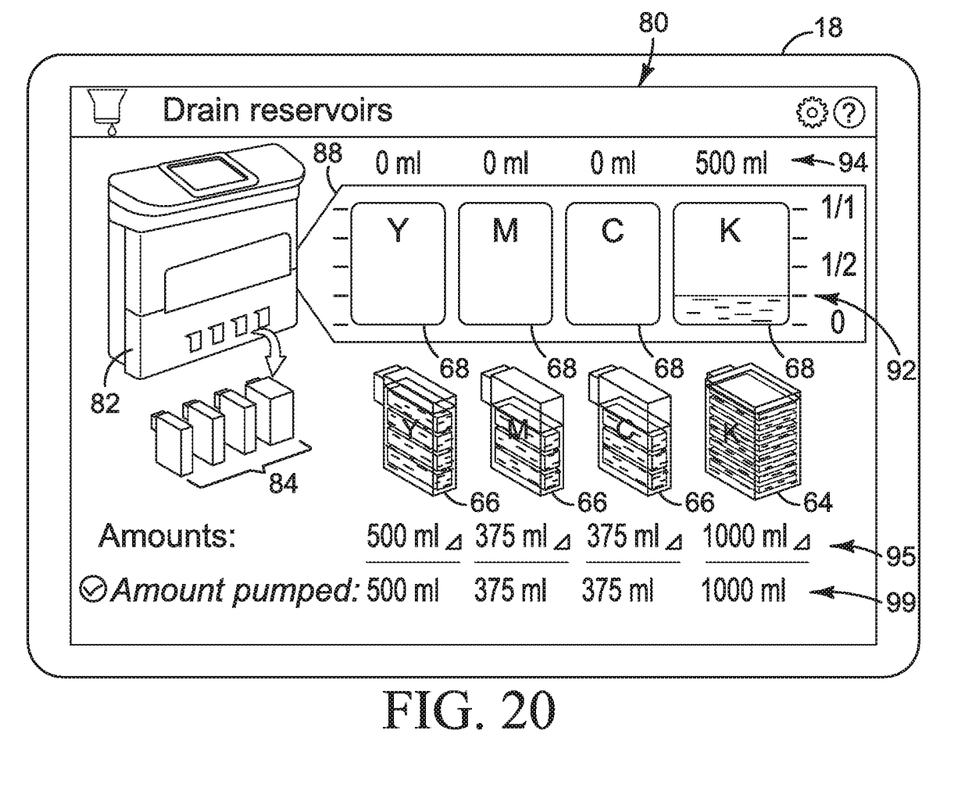

FIGS. 8-20 illustrate examples of a graphical user interface, such as interface 18 in FIGS. 1, 3, and 4, displaying some of the features described above for filling or draining a printer reservoir. FIGS. 8-13 show displays for setting the transfer unit and the number of units to transfer. FIGS. 14-17 show displays for a fill operation and FIGS. 18-20 show displays for a drain operation.

Figure 8:
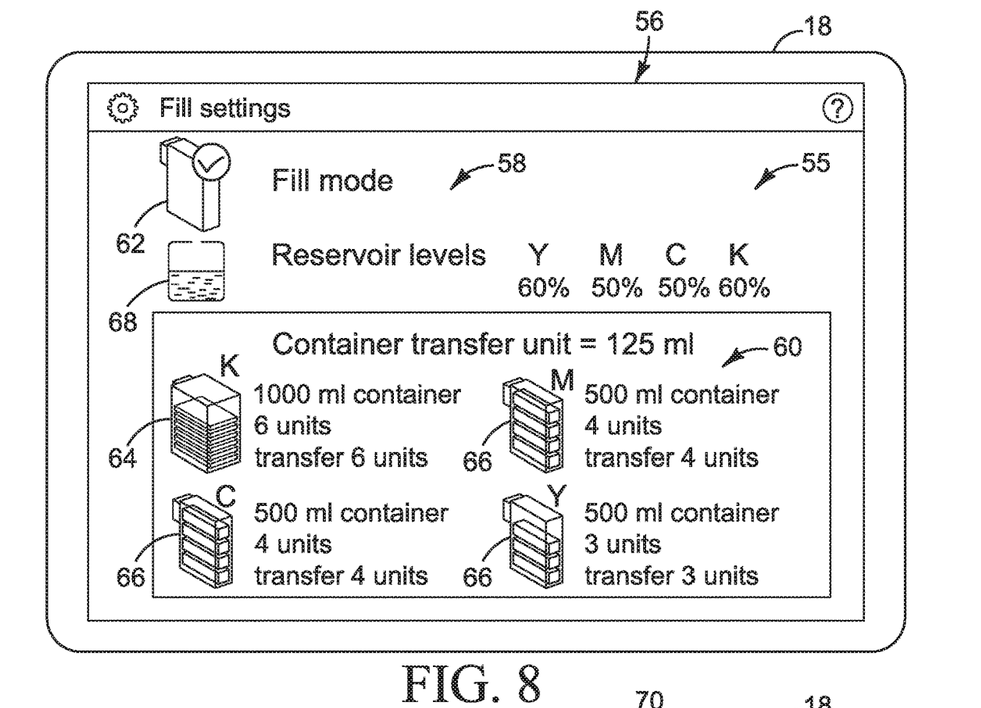
FIGS. 8-20 illustrate examples of a graphical user interface displaying features related to filling and draining agent reservoirs in a printer.

In FIG. 8, a user interface 18 displays a menu 55 for the selection of reservoir fill settings. Menu 55 in the fill settings display 56 in FIG. 8 includes two selectable menu items 58 and 60. Menu item 58 is represented by a fill mode symbol 62 with corresponding text that may be selected to set the fill mode. Menu item 60 includes container symbols 64, 66 with corresponding text showing the transfer units and the number of units to transfer for each container. Container symbols 64, 66 show graphically the number of units contained in each of two different size containers, 1000 ml and 500 ml respectively in this example. In this example, the supply containers for black (K) agent are larger than the supply containers for yellow (Y), magenta (M), and cyan (C) agent. FIG. 8 shows the container transfer unit set to 125 ml and the number of units to transfer set to 6 units for the black (K) container, 3 units for the yellow (Y) container, and 4 units for each of the cyan C and magenta (M) containers. Display 56 also includes a reservoir symbol 68 and corresponding text showing the volume of printing agent in each of 4 reservoirs for yellow (Y), magenta (M), cyan (C), and black (K).

Figure 9:
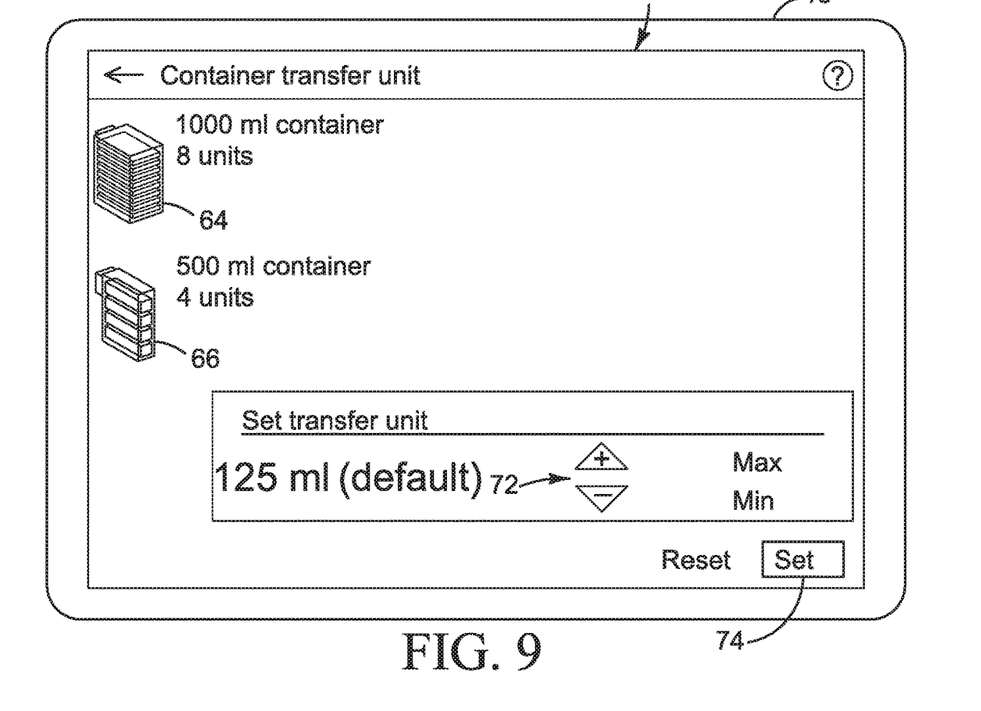
Figure 10:
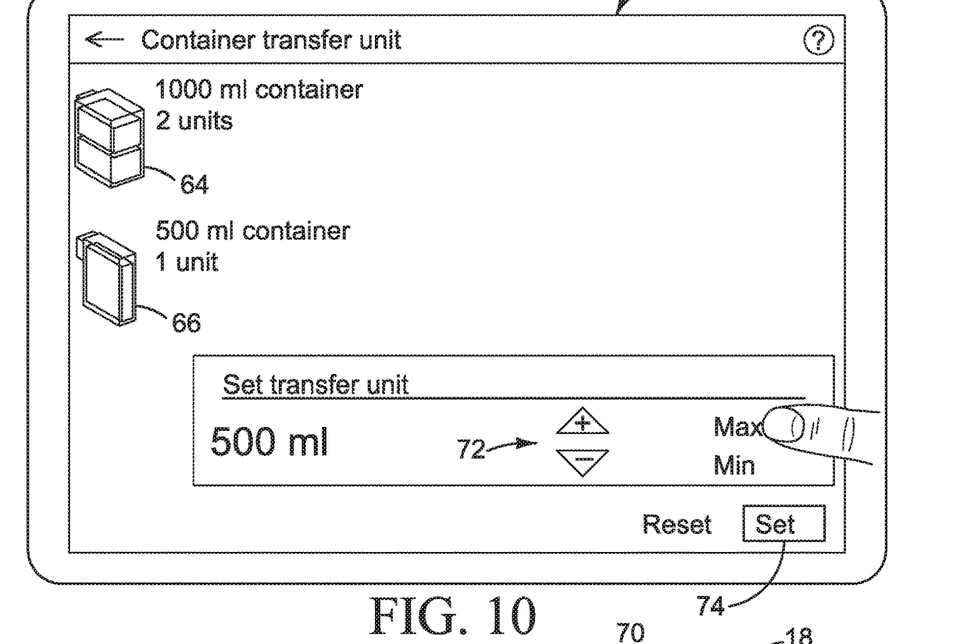
Figure 11:
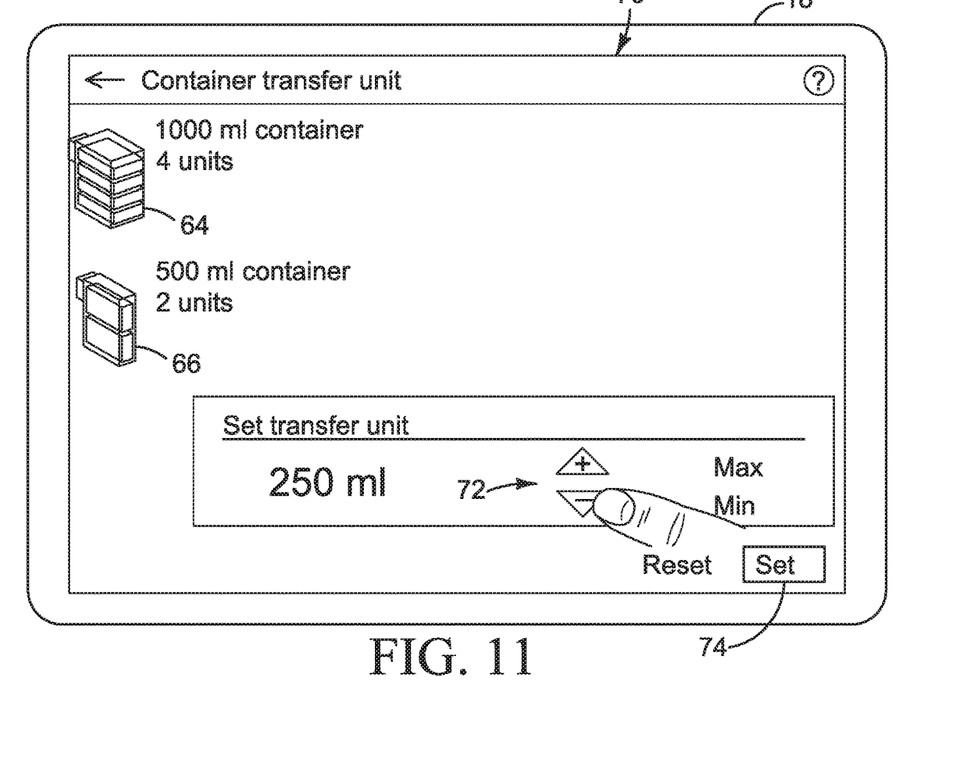

Selecting transfer unit menu item 60 in FIG. 8, indicated by the box around the symbols and text, displays the transfer unit selection menu shown in FIGS. 9-11. Referring to FIG. 9, a container transfer unit display 70 includes container symbols 64, 66 and a group of buttons 72 to set the transfer unit. In this example, button group 72 includes +, −, minimum and maximum buttons, allowing the user to increase, decrease, minimize, or maximize the size of the transfer unit. Also in this example, the default for each parameter is displayed until changed by the user. Transfer unit display 70 shows the size of the transfer unit (125 ml) and the number of units in each container—8 units in 1000 ml container 64 and 4 units in 500 ml container 66.

In FIG. 10, the user has selected a pre-set maximum transfer unit (500 ml in this example) and the corresponding number of units in each container is displayed—2 units in 1000 ml container 64 and 1 unit in 500 ml container 66. In FIG. 11, the user has arrowed down to select a transfer unit of 250 ml and the corresponding number of units in each container is displayed—4 units in 1000 ml container 64 and 2 units in 500 ml container 66. When the desired transfer unit is displayed, the user may click the "Set" button 74 in the lower right corner to set the transfer unit and automatically move to the display for setting the number of units to transfer shown in FIG. 12.

Figure 12:
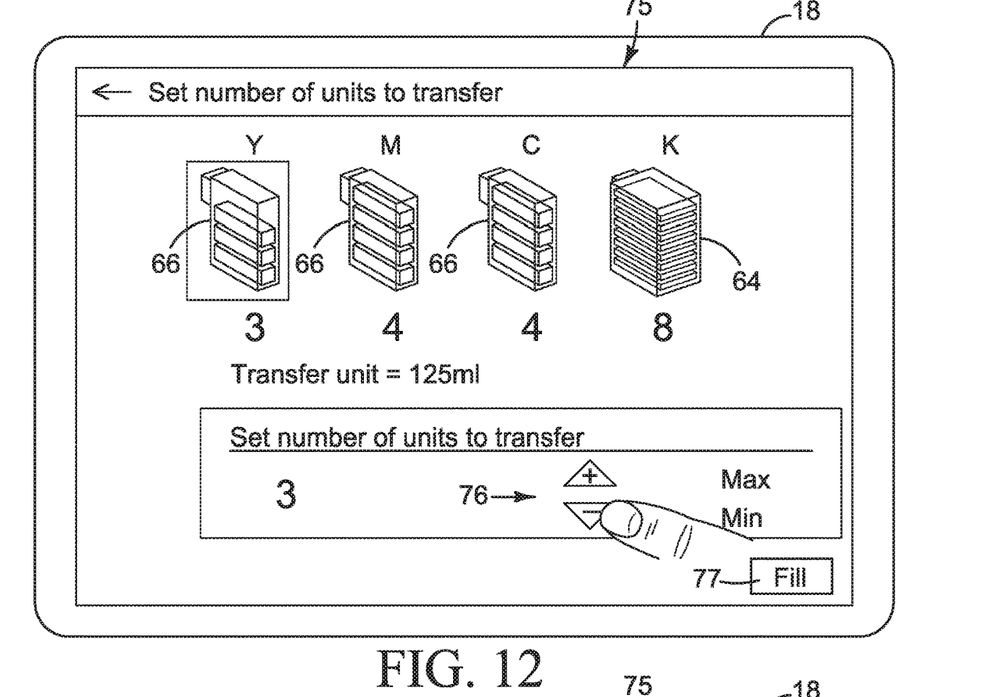
Figure 13:
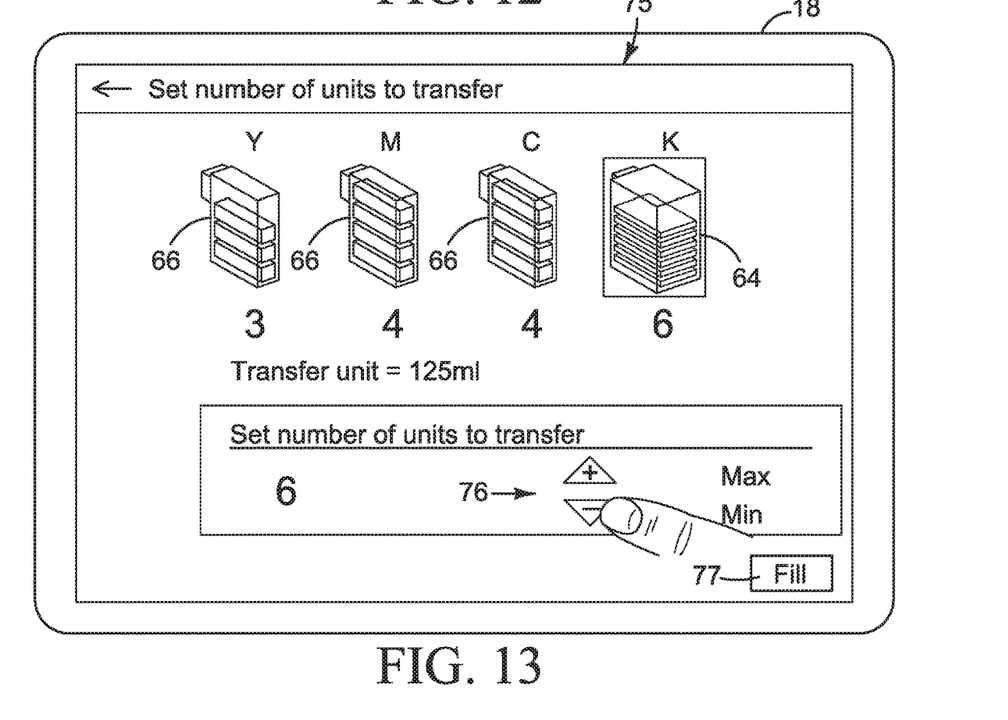

Referring to FIG. 12, a transfer unit number display 75 includes a group of buttons 76 to set the number of units to transfer for each of the Y, M, C, and K containers 64, 66. In this example, button group 76 includes +, −, minimum and maximum buttons, allowing the user to increase, decrease, minimize, or maximize the number units to transfer for each container. The default number of units is displayed until changed by the user. In this example, the default number is all units in the container. In FIG. 12, the yellow (Y) container 64 is selected and the user has set the number of 125 ml units to transfer at 3. The Y container symbol 66 is automatically updated to show the number of units to transfer. In FIG. 13, the black (K) container is selected and the user has set the number of 125 ml units to transfer at 6. When the desired settings are displayed, the user may click the "Fill" button 77 in the lower right corner to begin the sequence of filling the reservoirs, as shown in FIG. 14.

Figure 14:
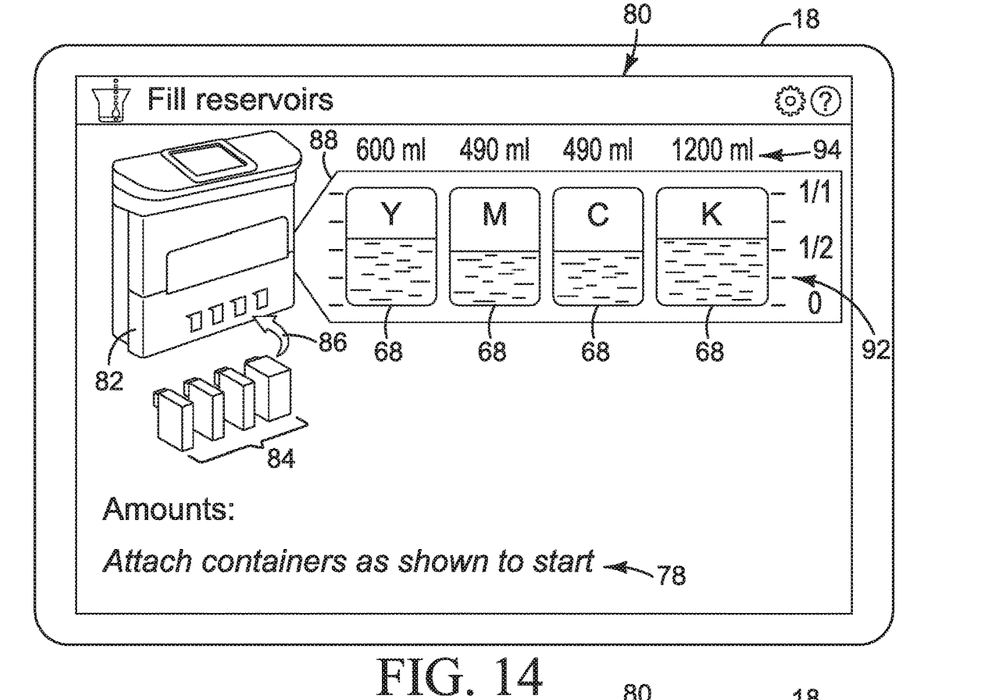

Referring to FIG. 14, user interface 18 displays a message 78 prompting a user to connect the supply containers to the printer to initiate a fill operation. Display 80 with message 78 may be initiated, for example, by opening a fill port door on the printer or selecting a fill option at the user interface. The initial fill display 80 in FIG. 14 includes a printer symbol 82, a first set 84 of container symbols near the printer symbol, and an arrow 86 to indicate connecting the containers to the printer. Display 80 also includes reservoir symbols 68 associated with printer symbol 82, for example with a bubble 88. Reservoir symbols 68 are animated to show the volume of printing agent in each reservoir. Display 80 may include a scale 92 indicating the level of agent in each reservoir and text 94 stating the volume of agent in each reservoir.

Figure 15:
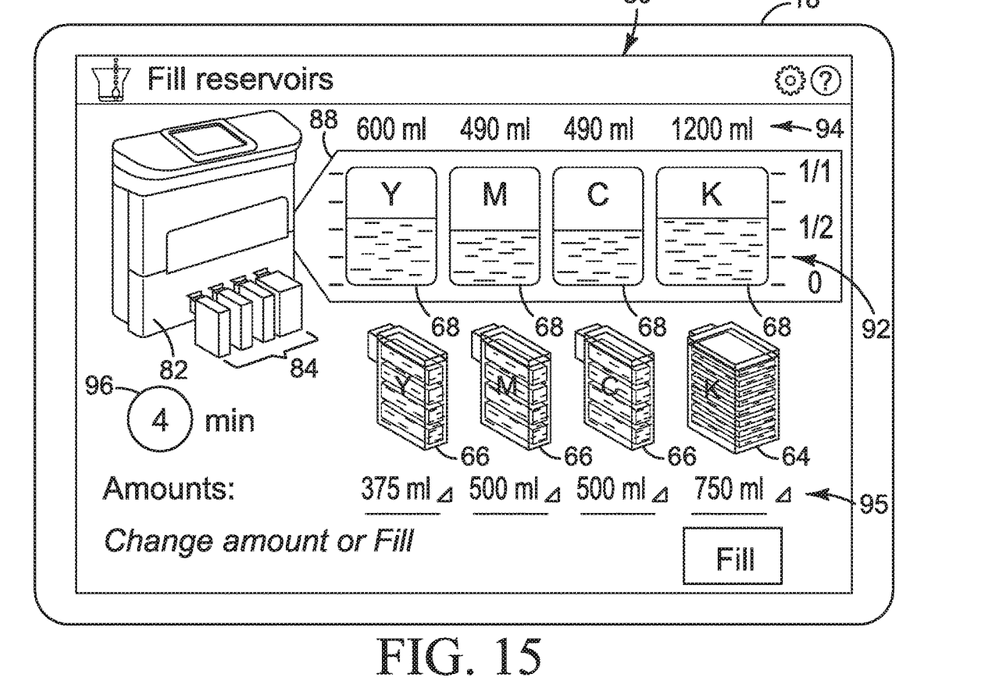

When the printer senses that the containers are connected, fill display 80 is changed to include container symbols 64, 66 and total fill amounts 95 as shown in FIG. 15. Referring to FIG. 15, container symbols 64, 66 show the volume of agent in each container as determined by the controller reading information from the container memories as described above with reference to FIG. 3. The user initiates the fill operation by selecting a "fill" button in the lower right corner of display 80. In this example, display 80 in FIG. 15 includes a timer symbol 96 showing an estimated time to complete the fill operation, 4 minutes in this example.

Figure 16:
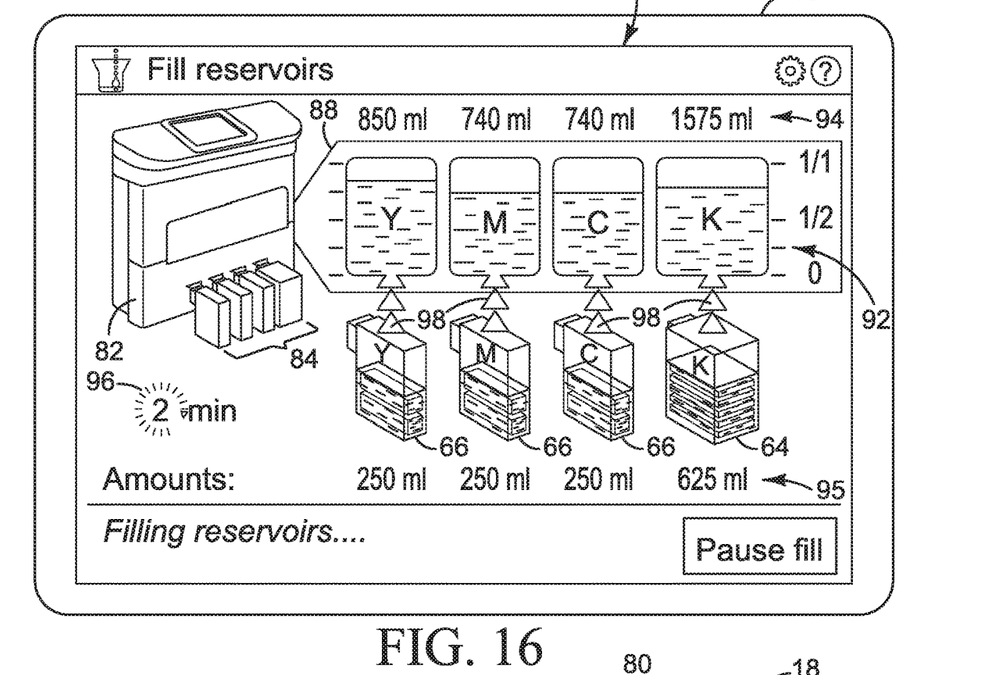

Referring to FIG. 16, when the user selects the "fill" button, the controller begins the fill operation, animates container symbols 64, 66, reservoir symbols 68, and text 94, 95 to show the changing volume of agent in each reservoir and corresponding container, and animates timer symbol 96 to countdown the time to complete the fill operation. Flow symbols 98 between each reservoir symbol 68 and corresponding container symbol 64, 66 shows that agent is flowing from the containers to the reservoirs.

Figure 17:
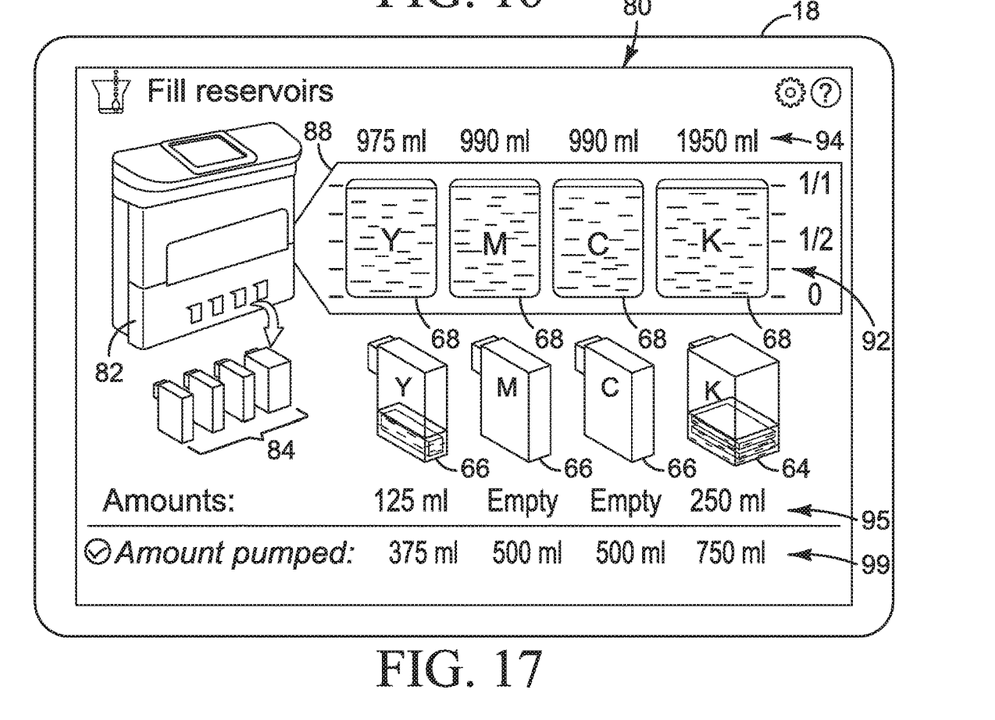

Referring to FIG. 17, the controller ends the fill operation when the set number of units have been transferred and, in this example, displays the ending volumes in each reservoir (symbols 68 and text 94), the ending volumes in each container (symbols 64, 66, and text 95), and the amounts pumped (text 99).

FIG. 16 shows just one snapshot in time from the beginning fill conditions shown in FIG. 15 to the ending fill conditions shown in FIG. 17. During the fill operation, the level of agent in each reservoir 68 in fill display 80 is rising, the corresponding volume numbers 94 are increasing, the level agent in each container 64, 66 is falling, and the corresponding volume numbers 95 are decreasing, as best seen by comparing display 80 in FIGS. 15, 16, and 17.

Similar displays are used for a drain operation. FIG. 18 shows a drain display 80 after the user has set the transfer unit and the number of units to transfer and attached the containers, in the same manner described above with reference to FIGS. 9-13 for the fill settings. In this example, each container is empty at the beginning of the drain operation, as depicted by container symbols 64, 68 in FIG. 18. Referring to FIG. 19, the user has selected the "drain" button in FIG. 18 and the controller is directing a drain operation, including animating container symbols 64, 66, reservoir symbols 68, and text 94, 95 to show the changing volume of printing agent in each reservoir and corresponding container. The controller has also animated timer symbol 96 to count down the time to complete the drain operation. A flow symbol 98 between each reservoir symbol 68 and corresponding container symbol 64, 66 shows that printing agent is flowing from the reservoirs to the containers.

Referring to FIG. 20, the controller ends the drain operation when the set volume has been transferred and, in this example, displays the ending volumes in each reservoir (symbols 68 and text 94), the ending volumes in each container (symbols 64, 66, and text 95), and the amounts pumped (text 99).

While the displays 80 on graphical user interface 18 in FIGS. 13-19 are described in the context of transfers made in set unit increments, such displays are not limited to transfers made in set unit increments but may depict transfers of any volume at any rate. Pumping rates may be the same or varied among Y, M, and C containers 66 and/or K container 64. More or fewer containers 64, 66 and reservoirs 68 and/or different size containers and reservoirs may be used.

As noted at the beginning of this Description, the examples shown in the figures and described above illustrate but do not limit the scope of the patent, which is defined in the following Claims.

"A" and "an" as used in the Claims means one or more.

The invention claimed is:

1. A system to fill or drain a reservoir in a printer, comprising:
   a controller to set a unit to a total capacity of a container divided by an integer greater than 1;
   a container sensor to sense the container connected to the printer; and
   a pump to pump, in set unit increments, at least one unit of a printing agent from the container to the reservoir or from the reservoir to the container.

2. The system of claim 1, comprising a graphical user interface operatively connected to the controller and wherein the controller is to set the unit based on a selection received through the graphical user interface.

3. The system of claim 1, wherein:
the controller is to set a number of the units to pump; and
the pump is to pump the set number of units of the printing agent from the container to the reservoir or from the reservoir to the container.

4. The system of claim 3, comprising a graphical user interface operatively connected to the controller and wherein the controller is to set the number of units to pump based on a selection received through the graphical user interface.

5. The system of claim 3, wherein:
the system comprises a reservoir sensor to sense a volume of the printing agent in the reservoir; and
the controller is to compute the number of units to pump based on the volume of the printing agent in the reservoir.

6. A process to fill or drain a reservoir in a printer, comprising:
setting a unit to a total capacity of a container divided by an integer greater than 1;
sensing the container connected to the printer; and
transferring, in set unit increments, at least one unit of a printing agent from the container to the reservoir or from the reservoir to the container.

7. The process of claim 6, wherein setting the unit comprises receiving a unit selection through a user interface or setting the unit to a default.

8. The process of claim 6, comprising setting a number of units to transfer and wherein the transferring comprises transferring the set number of units of the printing agent from the container to the reservoir or from the reservoir to the container.

9. The process of claim 8, wherein setting the number of the units to transfer comprises receiving a number of units to transfer selection through a user interface.

10. The process of claim 8, wherein setting the number of units to transfer comprises:
sensing a volume of the printing agent in the reservoir; and
computing the number of units to transfer based on the volume of printing agent in the reservoir.

11. The process of claim 6, comprising, while transferring the printing agent from the container to the reservoir or from the reservoir to the container:
determining a changing volume of the printing agent in the reservoir and a changing volume of the printing agent in the container; and
displaying an animation showing the changing volume of the printing agent in the reservoir and the changing volume of the printing agent in the container.

12. The process of claim 11, wherein the animation comprises:
a printer symbol;
a first container symbol connected to the printer symbol;
a reservoir symbol associated with the printer symbol, the reservoir symbol showing a changing volume of the printing agent in the reservoir;
a second container symbol near the reservoir symbol, the container symbol showing a changing volume of the printing agent in the container; and
a flow symbol between the reservoir symbol and the container symbol.

13. The process of claim 12, comprising:
completing the transfer of the printing agent;
stopping the animation; and
displaying completion of the transfer.

14. The process of claim 13, wherein displaying completion of the transfer includes displaying a volume of the printing agent in the reservoir and a volume of the printing agent in the container when the transfer is complete.

15. The process of claim 14, wherein displaying completion of the transfer includes displaying a total volume of the printing agent transferred from the container to the reservoir or from the reservoir to the container.

16. A memory having processor executable instructions to:
set a unit;
read, from a memory on a container, a volume of a printing agent in the container when the container is connected to a printer;
transfer, in set unit increments, at least one unit of the printing agent from the container to a reservoir in the printer or from the reservoir to the container; and
write, to the memory on the container, a volume of the printing agent in the container after the transfer.

17. The memory of claim 16, comprising instructions to:
repeatedly determine a volume of the printing agent in the reservoir during the transfer;
display, based on the reservoir volume determinations, a changing volume of the printing agent in the reservoir during the transfer;
repeatedly compute a volume of the printing agent in the container during the transfer based on the corresponding volume of the printing agent in the reservoir;
display, based on the container volume computations, a changing volume of the printing agent in the container during the transfer.

18. The memory of claim 17, wherein:
the instructions to display a changing volume of the printing agent in the reservoir during the transfer comprise instructions to animate a reservoir symbol to show the changing volume of the printing agent in the reservoir during the transfer; and
the instructions to display a changing volume of the printing agent in the container during the transfer comprise instructions to animate a container symbol to show the changing volume of the printing agent in the container during the transfer.

19. The memory of claim 16, comprising instructions to set a number of units to transfer and wherein the instructions to transfer comprise instructions to transfer the set number of units of the printing agent from the container to the reservoir or from the reservoir to the container.

20. The memory of claim 19, wherein the instructions to set the number of units of to transfer comprise instructions to:
receive a number of units to transfer selection through a user interface; or
compute the number of units to transfer based on a volume of the printing agent in the reservoir before the transfer.

21. A printer controller implementing the memory of claim 16.

22. A memory having processor executable instructions to generate a graphical user interface displaying, during a transfer of a printing agent from a container to a reservoir in a printer or from the reservoir to the container, an animation showing a changing volume of the printing agent in the reservoir and a changing volume of printing agent in the container.

23. The memory of claim 22, wherein the instructions to generate an animation comprises instructions to generate an animation that includes:

a printer symbol;
a first container symbol connected to the printer symbol;
a reservoir symbol associated with the printer symbol, the reservoir symbol showing a changing volume of the printing agent in the reservoir;
a second container symbol near the reservoir symbol, the second container symbol showing a changing volume of the printing agent in the container; and
a flow symbol between the reservoir symbol and the container symbol.

\* \* \* \* \*